(12) United States Patent
Song et al.

(10) Patent No.: US 12,397,194 B2
(45) Date of Patent: Aug. 26, 2025

(54) UPPER LIMB REHABILITATION APPARATUS FOR BOTH ARMS EXERCISE

(71) Applicant: NATIONAL REHABILITATION CENTER, Seoul (KR)

(72) Inventors: Won-Kyung Song, Seoul (KR); Jun Yong Song, Seoul (KR)

(73) Assignee: National Rehabilitation Center, Seoul (KR)

( * ) Notice: Subject to any disclaimer, the term of this patent is extended or adjusted under 35 U.S.C. 154(b) by 142 days.

(21) Appl. No.: 18/567,749

(22) PCT Filed: May 12, 2022

(86) PCT No.: PCT/KR2022/006793
§ 371 (c)(1),
(2) Date: Dec. 6, 2023

(87) PCT Pub. No.: WO2022/260294
PCT Pub. Date: Dec. 15, 2022

(65) Prior Publication Data
US 2024/0278069 A1    Aug. 22, 2024

(30) Foreign Application Priority Data
Jun. 8, 2021  (KR) .................. 10-2021-0073844

(51) Int. Cl.
*A63B 23/16*    (2006.01)
*A63B 21/00*    (2006.01)
(Continued)

(52) U.S. Cl.
CPC ............ *A63B 23/16* (2013.01); *A63B 21/023* (2013.01); *A63B 21/0442* (2013.01);
(Continued)

(58) Field of Classification Search
CPC ... A63B 23/16; A63B 21/023; A63B 21/0442; A63B 21/05; A63B 21/4035;
(Continued)

(56) References Cited

U.S. PATENT DOCUMENTS 6,613,000 B1    9/2003 Reinkensmeyer et al.

FOREIGN PATENT DOCUMENTS

JP    2004008744 A    1/2004
KR    101555871 B1    9/2015
(Continued)

*Primary Examiner* — Andrew S Lo
(74) *Attorney, Agent, or Firm* — Rabin & Berdo, P.C.

(57) ABSTRACT

Provided is an upper limb exercise apparatus including: a table (T); a first link (L1) and a second link (L2) which are disposed above the table and are used for a left arm exercise and a right arm exercise, respectively; and handles (100) provided at ends of the first link and the second link so as to be gripped by the left hand and the right hand, respectively, and comprising: cameras (160) provided inside the handles (100) so as to capture images of fingers holding the handles; and a control determination unit configured to detect and determine an action of a user gripping the handles on the basis of the images captured by the cameras. It maximizes the opportunity to use the upper limbs by means of coordinated movement of the pair of arms, and improves the upper limb function of stroke patients with disabilities caused by a stroke.

18 Claims, 4 Drawing Sheets

(51) Int. Cl.
  *A63B 21/02* (2006.01)
  *A63B 21/04* (2006.01)
  *A63B 21/05* (2006.01)
  *A63B 23/035* (2006.01)
  *A63B 24/00* (2006.01)

(52) U.S. Cl.
  CPC .......... *A63B 21/05* (2013.01); *A63B 21/4035* (2015.10); *A63B 21/4047* (2015.10); *A63B 23/03541* (2013.01); *A63B 24/0062* (2013.01); *A63B 2220/20* (2013.01); *A63B 2220/805* (2013.01); *A63B 2220/807* (2013.01); *A63B 2220/833* (2013.01)

(58) Field of Classification Search
  CPC .......... A63B 21/4047; A63B 23/03541; A63B 24/0062; A63B 2220/20; A63B 2220/805; A63B 2220/807; A63B 2220/833; A63B 21/0058; A63B 21/159; A63B 23/1209; A63B 23/1254; A63B 24/0087; A63B 23/12; A61H 1/02; A61H 1/0274; A61H 1/0285; A61H 2201/1635; A61H 2201/50; A61H 2201/5043; A61H 2201/5058; A61H 2201/5064; A61H 2201/5071; A61H 2201/5092; H04N 7/18
  See application file for complete search history.

(56) References Cited

FOREIGN PATENT DOCUMENTS

| | | |
|---|---|---|
| KR | 1020190020508 A | 3/2019 |
| KR | 102096292 B1 | 4/2020 | ns
UPPER LIMB REHABILITATION APPARATUS FOR BOTH ARMS EXERCISE

TECHNICAL FIELD

The present disclosure relates to an upper limb rehabilitation exercise apparatus used for rehabilitation of the elderly or patients by inducing rehabilitation movements within an exercise area, and in particular, to an upper limb exercise apparatus that helps with two-handed tasks related to daily life by including a means for detecting the action of the user gripping a handle with his hand or by measuring the force of the user's hand gripping the handle.

BACKGROUND ART

The upper limb rehabilitation devices have been developed for the increasing number of patients with stroke in this society that is moving into the aging or graying stage, and also for the increasing number of spinal cord injury patients in traffic accidents, the patients who lack active movement of his hands due to various diseases such as brain injury such as stroke, traumatic brain injury, cerebral palsy, or nervous system damage caused by spinal cord injury, and so on.

The related upper limb rehabilitation apparatus is configured to rehabilitate movements of the upper arms such as the shoulders, elbows, and the rehabilitation treatment is performed in the form of performing special movements on a work table, an example of which is disclosed in Korean Patent No. 10-2096292 which was applied for patent and registered by the same applicant.

The upper limb exercise apparatus according to the related art includes a base B, a frame 10 with one side fixed to the base, while varying in tilting angle, a table 20 mounted on the frame and displaying a target pointer, and 5-bar link-shaped movable parts 30 and 40 positioned above or below the table and including a first link 30 and a second link 40 that can be driven. In addition, the present disclosure includes a handle 50 to be gripped by a user (patient) by hand for upper limb exercise, and a series elastic actuator 60 for providing auxiliary movement by assisting the user in exerting a force on the handle, in which the first link 30 has a form in which a 1-1 member 31 and a 1-2 member 33 are connected to each other. The 1-1 member includes one end that is attached to the frame and is rotationally driven, and the 1-2 member includes one end that is attached rotatably to the other end of the 1-1 member by the first connection member 35 and the other end that has, attached thereto, the handle 50 gripped by the user. In addition, the second link 40 has a form in which a 2-1 member 41 and a 2-2 member 43 are connected to each other, and the 2-1 member 41 has one end attached to the frame and is rotatably driven, and the 2-2 member 43 has one end rotatably attached to the other end of the 2-1 member, and the other end has, attached thereto, the handle 50 gripped by the patient and the other end of the 1-2 member. In addition, the one end of the 1-1 member 31 and the one end of the 2-1 member 41 are provided with the series elastic actuators 60 for providing torques, respectively.

However, the related upper limb exercise apparatus has limitations in that it cannot support three-dimensional movement of the upper limb because the handle moves only in a two-dimensional plane, it has no means for measuring the strength of the hand or fingers gripping the handle, and it does not allow both hands to perform separate movements.

That is, according to the related art, the exercise uses only the two-dimensional force data from a sensor attached under the handle on a two-dimensional plane in which the upper limb exercise robot moves, and the two-dimensional force data can apply the auxiliary force or resistance force with respect to the handle movement. However, it is difficult to train daily life movements related to various movements of both hands and arms.

DETAILED DESCRIPTION OF INVENTION

Technical Problem

An object of the present disclosure is to provide an end-effector typed upper limb exercise apparatus that can be easily used by chronic stroke patients at hospitals or at home, allow input from both hands, and allow exercise of both arms.

An object of the present disclosure is to provide a technology that allows the stroke patients to easily perform upper limb exercise closely related to daily life through the interaction of two-hand tasks, by providing a structure that allows stroke-disabled people to perform various hand movements, such as handle gripping (seizing), pushing down, or pulling up (Z-axis), and by providing a structure that allows users to perform coordinated movements of both arms related to daily life using values from a force sensor attached to the handle or to a lower portion of the handle.

Technical Solution

The present disclosure provides an upper limb exercise apparatus which enables exercise of a pair of arms, which may include a table (T); a first link (L1) and a second link (L2) which are disposed above the table and are used for a left arm exercise and a right arm exercise, respectively; handles 100 provided at ends of the first link and the second link so as to be gripped by the left hand and the right hand, respectively, in which the handle may include a button that a user can press with his finger and input a specific signal by pressing the button.

In addition, the present invention provides an upper limb exercise apparatus which enables exercise of a pair of arms, which may include: a table (T); a first link (L1) and a second link (L2) which are disposed above the table and are used for a left arm exercise and a right arm exercise, respectively; handles 100 provided at ends of the first link and the second link so as to be gripped by a left hand and a right hand, respectively, and may further include cameras 160 provided inside the handles 100 to capture images of inner surfaces of the handles; and a control and determination unit which detects and determines a user's gripping of the handles on the basis of images captured by the cameras.

The present disclosure provides an upper limb exercise apparatus which enables exercise of a pair of arms, which may include: a table (T); a first link (L1) and a second link (L2) which are disposed above the table and are used for a left arm exercise and a right arm exercise, respectively; and handles 100 provided at ends of the first link and the second link so as to be gripped by the left hand and the right hand, respectively, in which the handle 100 may include: a first member 110 and a second member 120 that are separated from each other and arranged to face each other at a predetermined interval, a pivoting coupling part 130 provided at lower portions of the first member and the second member to pivotably couple the first and second members, a spring 140 provided between the first member and the second member to apply a repulsive force to the first and second members, and a distance sensor 150 provided at a position where the first member and the second member face each other to detect a distance between the first and second members, and an action of the user's hand gripping the handles or a gripping force of the user may be detected based on a value of the distance detected by the distance sensor.

Alternatively, the handle 100 may include: a first member 110 and a second member 120 that are separated from each other and arranged to face each other at a predetermined interval, a pivoting coupling part 130 provided at lower portions of the first member and the second member to pivotably couple the first and second members, a spring 140 provided between the first member and the second member to apply a repulsive force to the first and second members, and a plurality of contact sensors provided on a surface of either the first member or the second member facing the other, and an action of the user holding and gripping the handles causes the contact sensors to be brought into contact with the other of the first member or the second member, and the action of the user's hand gripping the handles or a gripping force of the user may be detected through whether or not the contact sensors are in contact.

The first member or the second member may further include a button that allows the user to press it with a finger and to input a specific signal by pressing the button.

The lower ends of the handles and an end of each of the first link and the second link may be connected with a ball joint structure, and a plurality of return springs (S) connecting the sides of the handles and the first link and the second link may be provided.

a handle receiving member 200 in a cylindrical shape having an upper portion open so as to receive the handle therein; The upper limb exercise apparatus which enables exercise of a pair of arms may further include: a spring 220 connecting the lower end of the handle and a bottom of the handle receiving member; and an optical sensor 230 provided on an inner surface of the handle receiving member to detect upward and downward movement of the handle, thereby detecting the action of the user pulling the handles upward or pressing them downward against the elastic force of the spring.

The spring 220 may be a tension spring or a compression spring, through which the handle may be movable up or down in a direction perpendicular to the table plane.

The upper limb exercise apparatus which enables exercise of a pair of arms may further include a camera 160 provided at a lower portion of the first member or the second member to capture images of the user's fingers gripping the handle, and the handle may be made of a transparent material, and the upper limb exercise apparatus may further include a determination control unit that estimates a posture of the hand through shadow information of the finger holding the handle captured by the camera.

The handles may be provided separately at each of the first link (L1) and the second link (L2), allowing the user to exercise his left arm and right arm at the same time or separately.

The position of the handle may be displayed on a user feedback display positioned on the table for the user to check, or the position of the handle may be displayed on a user feedback display positioned in front of the user for the user to check.

Effects of Invention

The present disclosure with the configuration described above allows various exercises to be performed using the upper limb exercise apparatus having both arm handles including force sensors, etc., and accordingly, there is a advantageous effect of improving upper limb function of stroke patients by maximizing opportunities to use the upper limbs through coordinated movements of both arms in consideration of the fact that most actions in daily life use both arms in a highly coordinated manner.

The upper limb exercise apparatus according to the present disclosure is an end-effector type that can be easily used by chronic stroke patients at hospitals or at home, allows input from both hands, also allows exercise of both arms, and moves on a plane (XY plane) but can enable interaction with objects in virtual space, etc. That is, the upper limb exercise apparatus according to the present disclosure can measure, with sensors, forces in three axes such as handle gripping (seizing), pushing down or pulling up (Z-axis) and using this, it is possible to identify various hand movements, and utilize such data to enable users to effectively perform both arm coordinated movements rehabilitation exercises necessary for daily life.

BEST MODE FOR EMBODYING INVENTION

The objectives, specific advantages and novel features of the present disclosure will become more apparent from the following detailed description and the preferred embodiments, which are associated with the accompanying drawings. In addition, terms described herein are terms defined in consideration of functions in the present invention, which may vary according to the intention or convention of a user or an operator. Therefore, definitions of these terms should be made based on the contents throughout the present specification.

Figure 1:
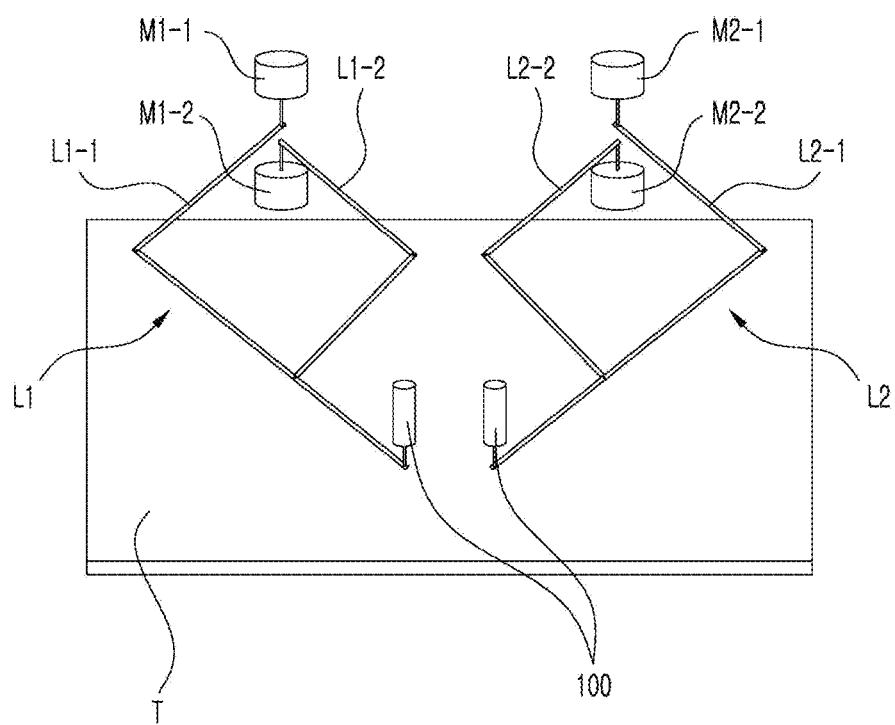
FIG. 1 is a schematic view of an upper limb exercise apparatus which enables exercise of a pair of arms according to the present disclosure.
Figure 2:
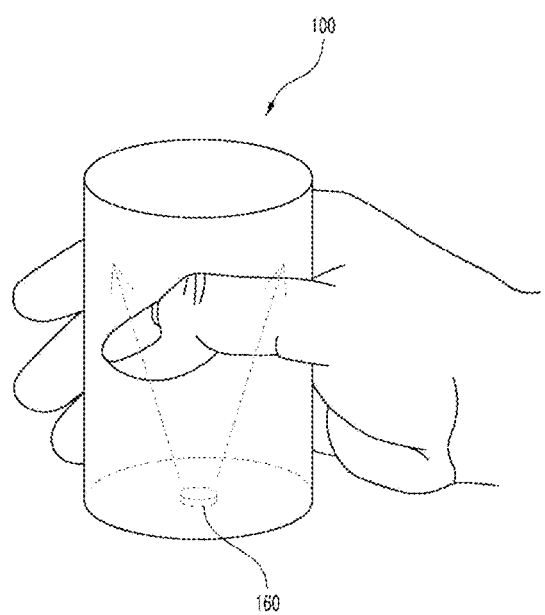
FIG. 2 is a view of a cylindrical handle of the upper limb exercise apparatus being held by hand, according to a first embodiment of the present disclosure.
Figure 3:
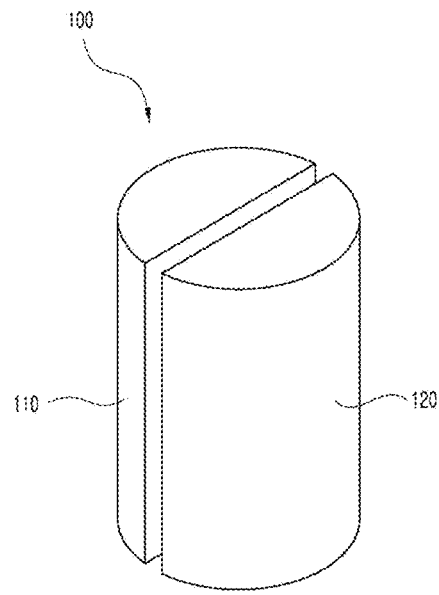
FIGS. 3 to 5 are a perspective view of the handle of the upper limb exercise apparatus, a longitudinal cross-sectional view of the handle, and a perspective view of the handle in disassembled state, according to a second embodiment of the present disclosure.
Figure 4:
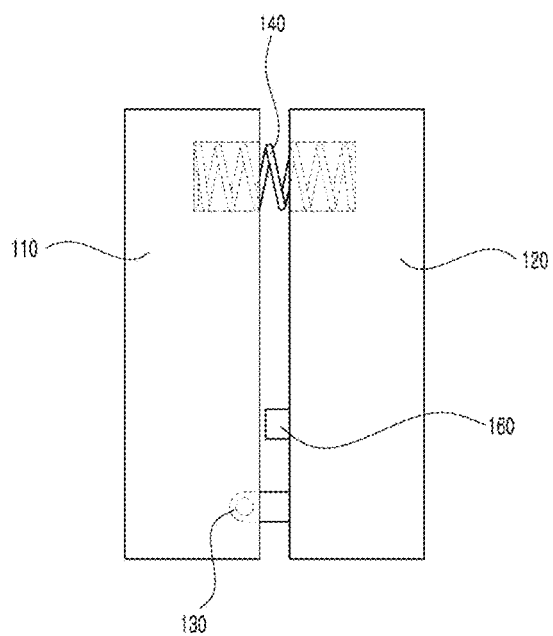
Figure 5:
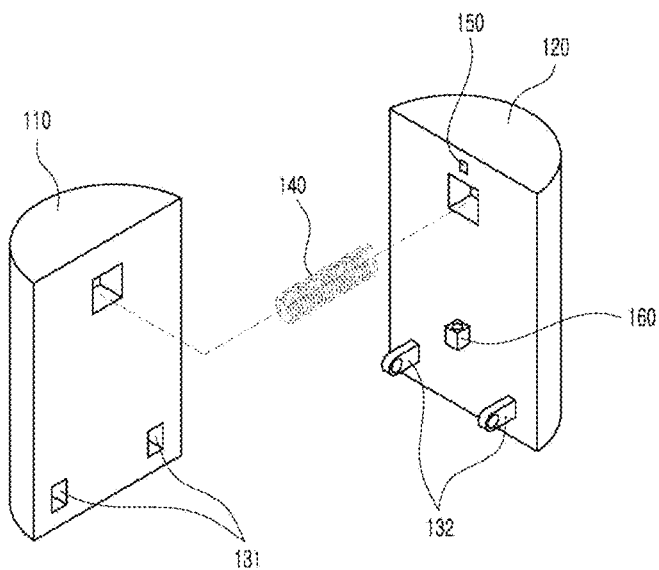
Figure 6:
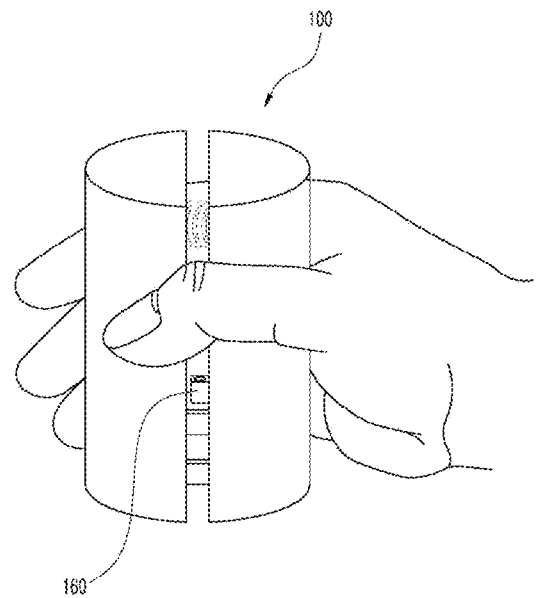
FIG. 6 is a view of the handle of the upper limb exercise apparatus being held by hand, according to the second embodiment of the present disclosure.
Figure 7:
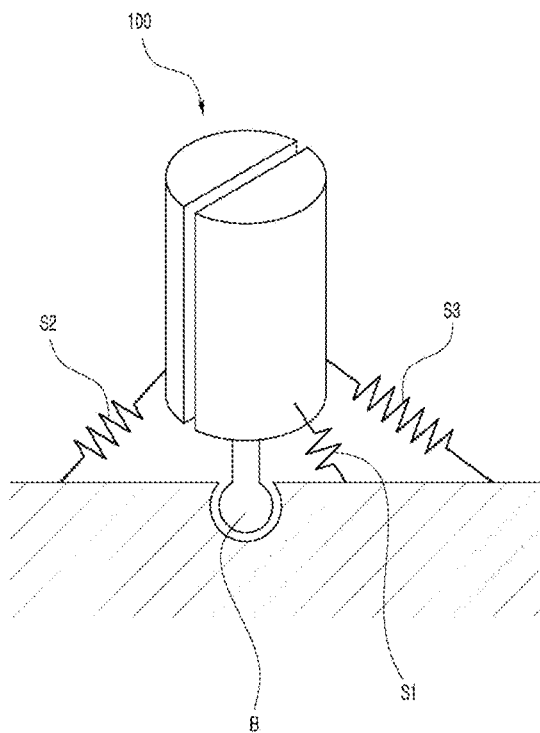
FIGS. 7 and 8 show the upper limb exercise apparatus according to another embodiment of the present disclosure.
Figure 8:
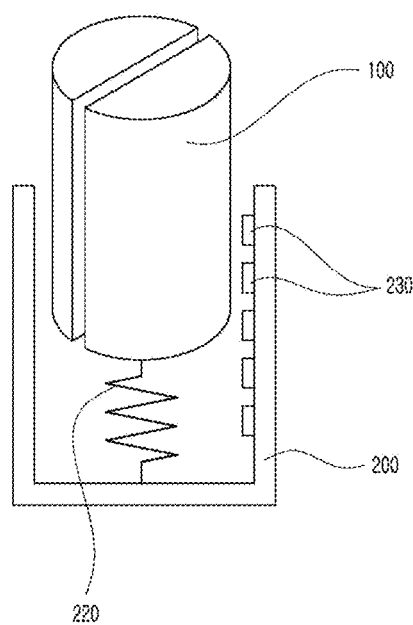

FIG. 1 is a schematic view of an upper limb exercise apparatus which enables exercise of a pair of arms according to the present disclosure, FIG. 2 is a view of a cylindrical handle of the upper limb exercise apparatus being held by hand, according to a first embodiment of the present disclosure, FIGS. 3 to 5 are a perspective view of the handle of the upper limb exercise apparatus, a longitudinal cross-sectional view of the handle, and a perspective view of the handle in disassembled state, according to a second embodiment of the present disclosure, FIG. 6 is a view of the handle of the upper limb exercise apparatus being held by hand, according to the second embodiment of the present disclosure, and FIGS. 7 and 8 show the upper limb exercise apparatus according to another embodiment of the present disclosure.

Hereinafter, the present disclosure will be described with reference to the drawings.

The present disclosure provides an upper limb exercise apparatus which enables exercise of a pair of arms, in which various sensors such as force sensors that can measure 3-axis force, a spring that can maintain orientation in three-dimensional space, etc. are attached under the handle, thereby enabling chronic stroke patients to easily use the apparatus at home and play various exercises or games related to two-hand coordinated movements that are often used in daily life. The disabled people or patients with impaired hands and arms can interact with the apparatus using both arms by performing a movement of gripping or pushing an object.

Referring to FIG. 1, an upper limb exercise apparatus of the present disclosure enables exercise of a pair of arms and includes a table (T), a first link (L1) and a second link (L2) which are disposed above the table and are used for a left arm exercise and a right arm exercise, respectively, and handles 100 provided at ends of the first link and the second link so as to be gripped by the left hand and the right hand, respectively. The other ends of each of the first link and the second link are coupled with motors M1 and M2, and the motors are fixed to the frame of the upper limb exercise apparatus. In addition, although not specifically shown in the drawings, a display may be provided, which performs various display functions to assist rehabilitation trainees in their training. The display may be positioned on the table T, or in front of the user, or there may be no display depending on cases.

The motors M1 and M2 may drive the first link (L1) and the second link (L2) so as to move the position of the handle 100, and may further include a reducer, an encoder, and the like that reduces the rotational speed of the motors and transmit the reduced speed to the first link or the second link. The speed reducer may include a plurality of connected gears to reduce the speed, and during the speed reduction process, the number of revolutions decreases but the torque is increased and may become extreme, and in order to compensate this, a spring may be disposed to transmit the torque to the first link or the second link smoothly. Since this is already known technology disclosed in publications including the earlier patent by the same applicant, a detailed description thereof will be omitted.

In the present disclosure, the first link (L1) includes a 1-1 link (L1-1) and a 1-2 link (L1-2) which are connected to the motors, in which the 1-1 link (L1-1) is coupled to the upper motor (M1), and the 1-2 link (L1-2) is coupled to the lower motor (M2). In an example, the upper motor (M1) and lower motor (M2) are motors are arranged vertically to drive the first link.

The reason for including two motors connected to the first link and placed one above the other is to prevent collision between the first link and the second link and ensure work space. Unlike the related example that allows only one-arm exercise, the present disclosure allows to train both hands and arms at the same time, and to this purpose, the above arrangement is provided so as to prevent the first and second links arranged on the left and right from colliding with each other during exercise and also to ensure space that can be used for work. Likewise, the second link (L2) includes a 2-1 link (L2-1) and a 2-2 link (L2-2), in which the 2-1 link (L2-1) is coupled to the upper motor (M1), and the 2-2 link (L2-2) is coupled to the lower motor (M2), for the same reason as described above for the first link. Using this structure, the present disclosure makes it possible to perform rehabilitation exercises using the left and right hands at the same time while moving along different trajectories.

According to the present disclosure, the handle 100 has the characteristics of being capable of detecting whether the user is gripping the handle with his hand, or of measuring the force of the user gripping the handle. In addition, the handle of the present disclosure allows a movement of lifting or lowering the handle in a direction perpendicular to a plane formed by the table (T) (in Z direction). For reference, in FIG. 1, the X-Y direction corresponds to the X-Y coordinates on the plane formed by the table (T). A spring (compression spring or tension spring) may be provided at a lower end of the handle to allow a movement of the handle in the Z direction, which will be explained in the description of FIG. 8.

First, a cylindrical handle as an example of the handle according to the first embodiment of the present disclosure will be described with reference to FIG. 2. The handle 100 of FIG. 2 has a means for detecting a user's motion of gripping with their fingers, which may include, provided therein, a camera 160 configured to capture images of the user's fingers gripping the handle. The camera is preferably placed at a bottom center inside the cylindrical handle, and for the image capture by the camera, the cylindrical handle is preferably configured in a hollow structure and made of a transparent material. When the upper limb exercise apparatus of the present disclosure is operated, the camera disposed inside the handle 100 captures an upper image, and when the user grips the handle, the camera may detect it through the captured image. In other words, a control determination unit configured to control the upper limb exercise apparatus and perform determination may detect and determine whether the user is holding the handle, based on the inner image of the handle captured by the camera, and perform appropriate operations necessary for rehabilitation exercise based on the determination result.

Hereinafter, a separable handle according to a second embodiment of the present disclosure will be described with reference to FIGS. 3 to 5. The handle of the present disclosure is provided with a structure for detecting an action of a user gripping with their fingers, or for measuring a strength of force of the user gripping the handle, and including a first member 110 and a second member 120 which are separate from each other and arranged to face each other at a predetermined interval. The first member and the second member are provided with a pivoting coupling part 130 formed at a lower portion thereof so as to allow the first and second members, which are spaced apart by the predetermined interval, to be moved in a direction of approaching each other in response to gripping by the user with his hand. The pivoting coupling part includes a groove 131 formed in a lower part of the first member 110 to receive a pivot axis therein, and the pivot axis 132 formed on a lower part of the second member 120 and pivotably received in the groove 131. The pivot axis and the groove may be formed in the first member and the second member, respectively. Accordingly, the structure is formed such that, when the user grips the handle with his hand and applies force, the first member and the second member may be pivoted on the axis coupled to the lower part to approach each other.

At this time, a spring 140 is provided between the first and second members approaching each other so as to apply a repulsive force between them to apply a load to the user's force. That is, the user applies force to overcome the elastic force of the spring, thereby moving the first member and the second member. In addition, a distance sensor 150 is provided to measure the strength of the user's hand. When the user moves the first member and the second member close to each other with his hand, the distance between the two decreases, the decreasing distance may be detected with the distance sensor 150, and based on these distance values, it is possible to determine the user's rehabilitation training status, and measure the strength of the user's hand gripping the handle and accumulate necessary data for effective rehabilitation.

A contact sensor may be used instead of the spring or the distance sensor to measure the force of the user gripping the handle with his hand. That is, a plurality of contact sensors are provided in the vertical direction on an inner surface of the first member (the surface facing the second member), and when the user grips the handle and makes a gripping motion, the second member approaches the first member pressing the contact sensors formed in the vertical direction, and at this time, it is possible to determine the force with which the user overcomes the elastic force of the spring and grips the handle by detecting the number or position of the pressed contact sensors. The contact sensors may be formed on a surface of the second member rather than the first member.

In addition, the handle of the present disclosure may further include a button for signal input, and in this case, the button may be formed at an an appropriate position where the user's finger is placed (e.g., on an upper surface of the first member or the second member, etc.), allowing the user to press it with his finger and input a specific signal by pressing the button. For example, the specific signal may signal the start or end of the rehabilitation exercise, or if a specific mission performed during the rehabilitation exercise is completed, the completion of the mission may be input by pressing the button.

Referring to FIG. 6, in the present disclosure, the camera 160 is provided at an appropriate position on the lower part of the first or second member to capture the image of the user's fingers wrapping around the handle 100. For image capturing, the handle may preferably be made of a transparent material, and the camera 160 may be positioned at a lower center portion of the handle so as to capture the images above, and in this case, using a difference in the shadow between the area where the finger is gripping the handle and the area where there is no finger gripping the handle, it is possible to check the gripping state and position on the handle. In other words, by capturing images of the finger grip state, it is possible to determine whether the finger is touching the handle or gripping it with an appropriate amount of force. The determination control unit of the upper limb exercise apparatus of the present disclosure may determine the gripping state of each finger and which of the fingers is gripping the handle, by using the shadow information of the fingers reflected on the handle and captured by the camera, and use the results as feedback information for rehabilitation exercises.

The handle 100 of the present disclosure may have a structure in which the lower end of the handle is pivotably returned to the original position, as shown in FIG. 7. That is, the lower end of the handle 100 is connected to the first link (or second link) with a ball joint (B) structure, and is provided with a plurality of return springs (S) connecting the side of the handle and the first link (or the second link). Through this, when the user removes the force after pivoting the handle left and right in the XY plane, the handle is returned to its original vertical position by the return springs.

As described above, according to the present disclosure, it is also possible to lift the handle 100 up or pushing it down in a direction perpendicular to the plane formed by the table T (Z direction) (see FIG. 8). In this embodiment, not only the handle 100, but also a handle receiving member 200 that accommodates the handle therein is provided. The handle receiving member may have a cylindrical shape having an upper portion open and may be provided on the first second links. In addition, a spring 220 is provided, connecting the lower part of the handle 100 and the bottom of the handle receiving member 200. The spring may be a tension spring or compression spring. In addition, one or a plurality of optical sensors 230 that detect the vertical movement of the handle may be disposed on an inner surface of the handle receiving member. The optical sensor detects the user's action of pulling the handle upward or pressing it down against the elastic force of the spring, and the distance by which the handle is pulled up or pressed down. Through this, the user's action of pulling the handle up or pressing it down in the Z direction perpendicular to the table plane is possible, allowing the user to perform upper limb rehabilitation exercises in this direction.

The handles are provided separately at each of the first link (L1) and the second link (L2), allowing the user to exercise his left arm and right arm at the same time or separately, and the position of the handle is displayed on the table for the user to check, and the user is also able to perform actions such as moving the handle along specific points displayed on the table, which are the technologies already known in the art and will not be described in detail.

Instead of the force sensor that can measure the gripping force, the handle may be configured with a plurality of switches attached thereto to measure the strength of the gripping force step by step. The handle may be configured to measure the strength of force by using the spring and the distance sensor, and instead of the force sensor provided under the handle to measure 3-axis force, the handle may be configured to measure the strength of the pressing force step by step by using a spring and an optical sensor (photo interrupter).

Chronic stroke patients gradually lose the use of the affected hand, resulting in more severe functional limitations, and to solve this problem, a plan is needed to maximize the opportunity to use both upper limbs at the same time. It has been shown that using both upper limbs at the same time can improve the posture and movement of the affected upper limb and increase movement speed, and accordingly, rehabilitation exercises that enable efficient use of coordinated movements of both arms are needed.

As shown in FIG. 1, a chronic stroke patient grips the two handles of the upper limb exercise apparatus which enables exercise of a pair of arms with both hands so as to exercise the upper limbs. The position of the handle is displayed in real time on the display positioned under the handle or in front of the user for the user to check, and the movement signal of the handle may be applied to the exercises related to daily life or related games. The upper limb exercise apparatus is illustrated as moving in the plane, but the handle may also move in the up/down direction (the direction perpendicular to the table plane, or the Z direction in FIG. 1). Using this, the action of the user pressing down or lifting up the handle may be used as an input signal to play a game.

As shown in FIG. 6, in order to detect the posture of the finger holding the handle, a hand gripping a translucent handle may be captured with a small camera at the lower end of the handle, thus obtaining the shadow information, and it is possible to estimate the posture of the hand gripping the handle using the shadow information. The handle includes a force sensor that can measure the gripping strength of the hand, allowing the user to train to grip an object with his hand or let it go. A button that can be pressed by hand may be provided on the handle at a desired position, so that the user may press this button and use it as an input signal while playing the game. The button may be configured to be pressed upon gripping the handle and used as an input signal.

Using the two handles, it is possible to exercise both arms at the same time during exercises related to daily life. Additionally, it is possible to measure the force applied to both handles to perform tasks involving both hands cooperating with each other, such as lifting or putting down a tray or object with both hands, gripping an object, etc., with a 3-axis force sensor and use the measured results as an input signal for the exercise or games. As shown in FIG. 7, springs may be attached to the bottom of the handle to help it return to original position after the user has moved the handle, and the force of the spring may be adjusted appropriately according to the degree of the user's hand function.

In addition, the present disclosure includes both the structure in which the handle is separated into two, i.e., the first member and the second member and the structure in which the handle is provided in a single cylindrical shape. That is, while the handle is described above either with the separated structures or the cylindrical structure, this is for convenience of explanation, and it goes without saying that the embodiment illustrating one certain shape can also be applied to a handle structure of the other shape. For example, additionally providing a button that the user can press with his finger and input a specific signal by pressing may also be applied to the cylindrical handle.

That is, the lower end of the cylindrical handle and the end of the first link (or the second link) may be connected by a ball joint structure, and a plurality of return springs (S) may be provided, connecting the side of the handle and the first link (or the second link). In addition, a handle receiving member to receive the cylindrical handle therein may be provided, the lower end of the handle and the bottom of the handle receiving member may be connected with a spring, and the optical sensor that detects the upward and downward movement of the handle may be disposed on the inner surface of the handle receiving member, and in this state, it is possible to detect the user's action of pulling the handle upward or pressing the handle downward against the elastic force of the spring and use the result as an input signal, which is the same as described above in the structure where the handle is separated into two parts.

The invention claimed is:

1. An upper limb exercise apparatus which enables exercise of a pair of arms, comprising:
  a table (T);
  a first link (L1) and a second link (L2) which are disposed above the table and are used for a left arm exercise and a right arm exercise, respectively; and
  handles (100) provided at ends of the first link and the second link so as to be gripped by a left hand and a right hand, respectively,
  and further comprising:
  cameras (160) provided inside the handles (100) to capture images of inner surfaces of the handles; and
  a control determination unit configured to detect and determine an action of a user gripping the handles on the basis of the images captured by the cameras.

2. The upper limb exercise apparatus according to claim 1, wherein lower ends of one of the handless and an end of the first link are connected with a ball joint structure, and a plurality of return springs(S) connecting sides of one of the handless and the first link are provided.

3. The upper limb exercise apparatus according to claim 1, wherein lower ends of one of the handless and an end of the second link are connected with a ball joint structure, and a plurality of return springs(S) connecting sides of one of the handless and the second link are provided.

4. An upper limb exercise apparatus which enables exercise of a pair of arms, comprising:
  a table (T);
  a first link (L1) and a second link (L2) which are disposed above the table and are used for a left arm exercise and a right arm exercise, respectively;
  handles (100) provided at ends of the first link and the second link so as to be gripped by a left hand and a right hand, respectively, wherein each handle comprises a button that a user can press with his finger and input a specific signal by pressing the button;
  a handle receiving member in a cylindrical shape having an upper portion open so as to receive one of the handles therein;
  a spring connecting the lower end of one of the handles and a bottom of the handle receiving member;
  an optical sensor provided on an inner surface of the handle receiving member to detect upward and downward movement of one of the handles; and
  a control determination unit configured to detect an action of the user pulling the handles upward or pressing the handles downward against an elastic force of the spring, and to use a detected result as an input signal.

5. The upper limb exercise apparatus according to claim 4, wherein lower ends of one of the handless and an end of the first link are connected with a ball joint structure, and a plurality of return springs(S) connecting sides of one of the handless and the first link are provided.

6. The upper limb exercise apparatus according to claim 4, wherein lower ends of one of the handless and an end of the second link are connected with a ball joint structure, and a plurality of return springs(S) connecting sides of one of the handless and the second link are provided.

7. The upper limb exercise apparatus according to claim 4, wherein:
  actions including an action of lifting or lowering the two separately provided handles at the same time, or an action of bringing them together in the middle are enabled, and
  the control determination unit uses each of the actions including the action of lifting or lowering the two handles at the same time, or the action of bringing them together in the middle as an input signal.

8. An upper limb exercise apparatus which enables exercise of a pair of arms, comprising:
  a table (T);
  a first link (L1) and a second link (L2) which are disposed above the table and are used for a left arm exercise and a right arm exercise, respectively; and
  handles (100) provided at ends of the first link and the second link so as to be gripped by the left hand and the right hand, respectively,
  wherein each handles (100) includes:
  a first member (110) and a second member (120) that are separated from each other and arranged to face each other at a predetermined interval;
  a pivoting coupling part (130) provided at lower portions of the first member and the second member to pivotably couple the first and second members;
  a spring (140) provided between the first member and the second member to apply a repulsive force to the first and second members; and a distance sensor (150) or one or a plurality of contact sensors, the distance sensor being provided at a position where the first member and the second member face each other and being configured to detect a distance between the first and second members, the contact sensors being provided on a surface of one of the first member and the second member facing the other and being configured to be brought into contact with the other of the first member and the second member caused by an action of the user holding and gripping the handles, and wherein an action of the user's hand gripping the handles or a gripping force of the user is detected based on a value of the distance detected by the distance sensor or through whether or not the contact sensors are brought into contact.

9. The upper limb exercise apparatus according to claim 8, wherein the first member or the second member further includes a button that allows the user to press it with his finger and to input a specific signal by pressing the button.

10. The upper limb exercise apparatus according to claim 8, wherein lower ends of one of the handless and an end of the first link are connected with a ball joint structure, and a plurality of return springs(S) connecting sides of one of the handless and the first link are provided.

11. The upper limb exercise apparatus according to claim 8, wherein lower ends of one of the handless and an end of the second link are connected with a ball joint structure, and a plurality of return springs(S) connecting sides of one of the handless and the second link are provided.

12. The upper limb exercise apparatus according to claim 8, further comprising:

a handle receiving member (200) in a cylindrical shape having an upper portion open so as to receive the handles therein;

a spring (220) connecting the lower end of one of the handles and a bottom of one of the handles receiving member;

an optical sensor (230) provided on an inner surface of one of the handles receiving member to detect upward and downward movement of one of the handle; and a control determination unit configured to detect an action of the user pulling the handle upward or pressing the handles downward against an elastic force of the spring, and uses the detected result as an input signal.

13. The upper limb exercise apparatus according to claim 12, wherein the spring (220) may be a tension spring or a compression spring, through which the handle is movable up or down in a direction perpendicular to the table plane.

14. The upper limb exercise apparatus according to claim 8, further comprising a camera (160) provided at a lower portion of the first member or the second member to capture images of an inner surface of one of the handles.

15. The upper limb exercise apparatus according to claim 8, wherein the handles is made of a transparent material, and the upper limb exercise apparatus further includes a control determination unit configured to determine which of the user's fingers is gripping the handle, based on shadow information of the finger gripping the handle captured by the camera.

16. The upper limb exercise apparatus according to claim 8, wherein the handles are provided separately at each of the first link (L1) and the second link (L2), allowing the user to exercise his left arm and right arm at the same time or separately, actions including an action of lifting or lowering the two separately provided handles at the same time, or an action of bringing them together in the middle are enabled, and the upper limb exercise apparatus further comprises a control determination unit that uses each of the actions including the action of lifting or lowering the two handles at the same time, or the action of bringing them together in the middle as an input signal.

17. The upper limb exercise apparatus according to claim 16, wherein a position of one of the handles is displayed on a user feedback display positioned on the table for the user to check.

18. The upper limb exercise apparatus according to claim 16, wherein a position of one of the handles is displayed on a user feedback display positioned in front of the user for the user to check.

* * * * *